United States Patent Office 3,711,506
Patented Jan. 16, 1973

3,711,506
SUBSTITUTED 3-AMINOINDAZOLES
Klaus Wagner, Cologne-Buchheim, and Ernst Roos, Cologne-Flittard, Germany, assignors to Farbenfabriken Bayer Aktiengesellschaft, Leverkusen, Germany
No Drawing. Filed May 26, 1969, Ser. No. 827,917
Claims priority, application Germany, June 15, 1968,
P 17 70 649.9
Int. Cl. C07d 49/20
U.S. Cl. 260—310 C          5 Claims

ABSTRACT OF THE DISCLOSURE

Substituted 3-aminoindazoles are obtained by reacting benzonitrile derivatives which contain an XR-group (X=O, S; R=alkyl, aryl) in the 2-position and an electronegative substituent in the 3- and 5-positions, with optionally monosubstituted hydrazine, optionally in a solvent and/or in the presence of catalytic quantities of an acid. The radicals R in the group XR— are preferably alkyl radicals with from 1 to 4 carbon atoms and aryl radicals with up to 12 carbon atoms.

The compounds e.g. 3 - amino-5,7-dinitroindazole are suitable for use as yellow, orange or red pigments for example for dyeing plastics.

---

It is already known that 2,4-dinitro-6-cyanoaniline and N-substituted 2,4-dinitro-6-cyanoaniline derivatives can be obtained by reacting 2,4-dinitro-6-cyanoalkoxybenzenes with ammonia and with primary and secondary aliphatic amines, respectively (cf. French patent specification No. 1,369,628).

This reaction mechanism would have been expected to give 2,4 - dinitro-6-cyanophenyl hydrazine and N-substituted-2,4-dinitro-6-cyanophenylhydrazine derivatives as reaction products from the reactions of 2,4-dinitro-6-cyanoalkoxybenzenes with hydrazine and with a monosubstituted hydrazine, respectively.

It has now been found that substituted 3-aminoindazoles can be obtained by reacting benzonitrile derivatives which contain an XR-group (X=O, S; R=alkyl, aryl) in the 2-position and an electronegative substituent in the 3- and 5-positions, with optionally monosubstituted hydrazine, optionally in a solvent and/or in the presence of catalytic quantities of an acid. The radicals R in the group XR— are preferably alkyl radicals with from 1 to 4 carbon atoms and aryl radicals with up to 12 carbon atoms.

Starting compounds preferably used for the process include benzonitriles of the formula:

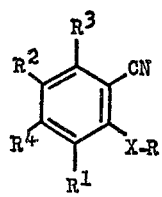

in which
X represents an oxygen or sulphur atom and R represents a hydrocarbon radical;
$R^1$ and $R^2$ represent similar or different electronegative groups such as nitro-, cyano- and sulphonyl groups; and
$R^3$ and $R^4$ represent hydrogen atoms and/or alkyl-, alkoxy-, alkylthio-, aryloxy- or arylthio groups.

In the context of the above definition, hydrocarbon radicals include inter alia linear or branched alkyl radicals, particularly those containing from 1 to 4 carbon atoms, and aryl radicals containing up to 12 carbon atoms, for example, phenyl-, naphthyl-, tolyl and diphenyl radicals.

Examples of these benzonitrile derivatives may be represented by the following formulae:

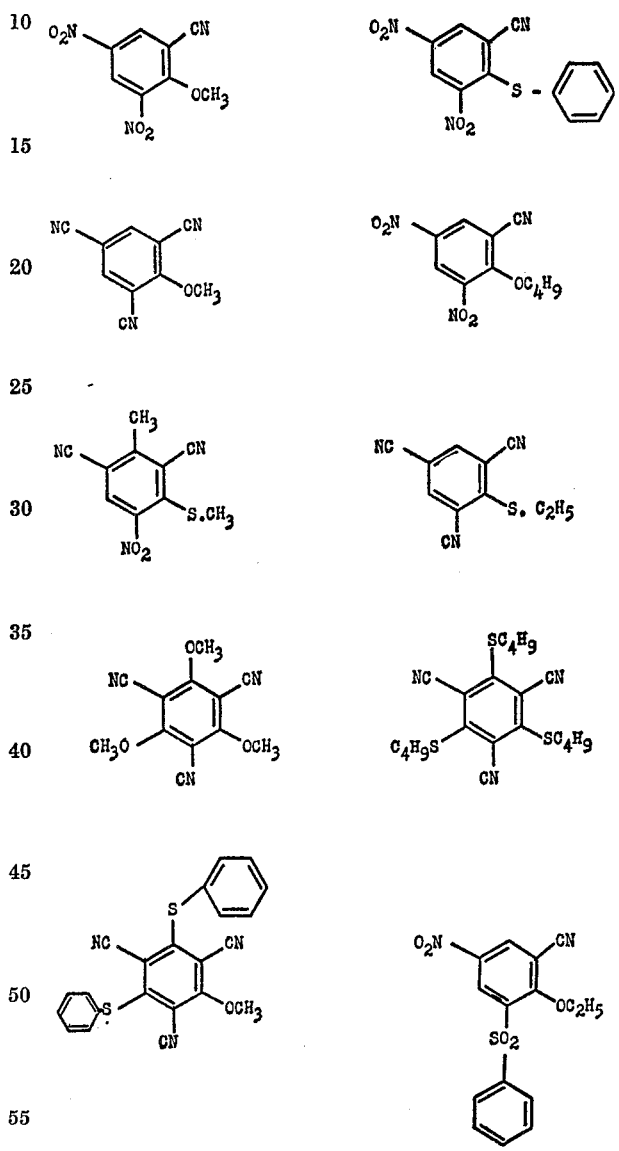

Suitable optionally monosubstituted hydrazines may be represented by the formula:

$$H_2N—NH—R^5 \qquad (II)$$

in which $R^5$ represents a hydrogen atom or an optionally substituted alkyl-, aralkyl-, aryl-, acyl-, carbamoyl- or guanyl group or a heterocyclic radical. Examples of these hydrazine compounds include hydrazine itself, monomethyl hydrazine, monoethyl hydrazine, monophenyl hydrazine, mononitrophenyl hydrazine, semicarbazide,

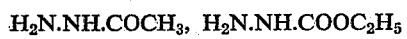
 and

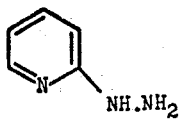

Some of the 3-aminoindazoles obtainable by the process may be represented by the general formula:

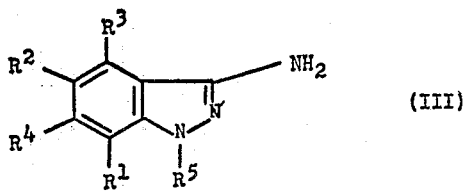

(III)

in which the radicals $R^1$ to $R^5$ are defined above.

In the process, therefore, elimination of the RX-group in the form of the corresponding alcohol or mercaptan is accompanied by cyclising with the o-cyano group into the 3-aminoindazole derivative. Some of the 3-aminoindazoles obtained by the process are reproduced below:

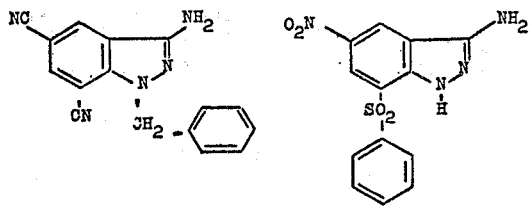

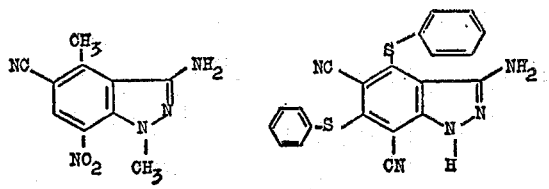

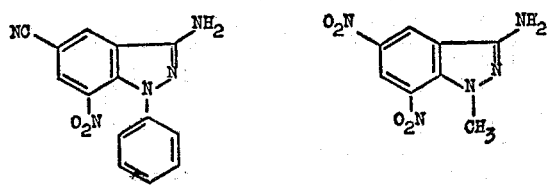

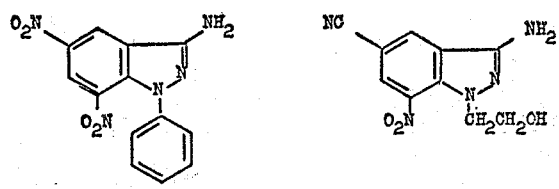

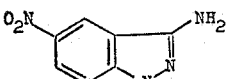

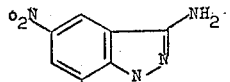

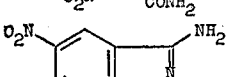

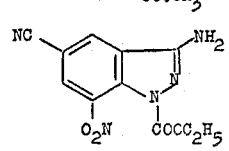

The reaction according to the invention is preferably carried out in the presence of inert organic solvents and in general at temperatures of from 20 to 100° C., in particular, from 40 to 60° C. Suitable solvents include lower alcohols such as methanol, ethanol and propanol. In some cases, it has proved to be of particular advantage to carry out the process in a weakly acid pH-range, i.e. in the presence of catalytic quantities of an acid, for example, glacial acetic acid.

To carry out the process, a solution of a benzonitrile of the general Formula I in the solvent, for example, methanol, may be reacted in separate portions with at least the equimolar total quantity of the hydrazine compound at temperatures of from 40 to 60° C., and the fully reacted solution is subsequently stirred for 2 hours at 60° C.

In other words, the hydrazine is generally used in a slight stoichiometric excess, for example, from 1.0 to 10 mols of the hydrazine per mol of the benzonitrile. The novel 3-aminoindazoles accumulate during the reaction in the form of deep-red crystalline compounds, may be separated off in the usual way and are obtained pure in high yields, for example, after washing with water or methanol.

The claimed process is illustrated by the following general reaction equation in which the radicals R to $R^5$ and X are as defined above, and by the following examples.

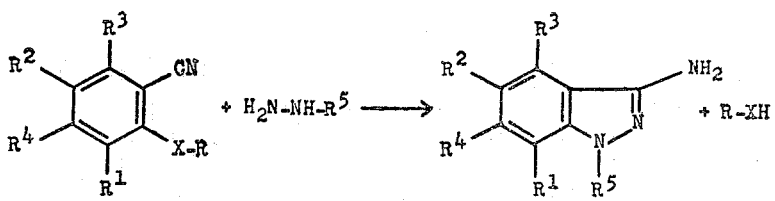

The substituted 3-aminoindazoles are suitable for use as yellow, orange or red pigments, for example for dyeing plastics.

A mixture of 65 parts by weight of polyvinyl chloride, 35 parts by weight of di-isooctylphthalate, 2 parts by weight of dibutyl tin mercaptide, 0.5 part by weight of titanium dioxide and 0.5 part by weight of 3-amino-5,7-dinitroindazole, which was finely divided by grinding in the presence of sodium chloride and N-methylpyrrolidone, is coloured on mixing rolls at 165° C. A red-coloured mass is obtained which may be used for the production of sheeting and mouldings. The colour finish obtained is distinguished by its fastness both to light and to plasticisers. Colour finishes of similar shade and fastness are obtained when the other 3-aminoindazoles obtainable by the process according to the invention are worked in.

EXAMPLE 1

22.3 g. (0.1 mol) of 2,4-dinitro-6-cyanoanisole are dissolved in 250 cc. of methanol. 7.5 g. (0.15 mol) of hydrazine hydrate are slowly added to this solution with stirring at 40 to 50° C., and the reaction mixture stirred for another 2 hours at 60° C. After cooling, the deep-red product precipitated is filtered off under suction, and the filtration residue is washed with water and then with methanol and dried. 3-amino-5,7-dinitroindazole, in the form of deep-red crystals melting at 330° C. (with decomposition) is obtained in a yield of 22 g. (99% of the theoretical).

*Analysis.*—Calcd. for $C_7H_5N_5O_4$ (223.2) (percent): C, 37.6; H, 2.3; O, 28.6; N, 31.4. Found (percent): C, 37.9; H, 2.6; O, 28.8; N, 31.3.

EXAMPLE 2

40.6 g. (0.2 mol) of 2,4-dicyano-6-nitroanisole are dissolved in 300 cc. of methanol and 24 g. (0.4 mol) of acetic acid, and 15 g. (0.3 mol) of hydrazine hydrate are added in portions to the resulting solution with stirring.

The reaction mixture is stirred for 2 hours at 60° C. and left to cool and the dark red product precipitated is filtered off under suction. After washing with water and methanol, 3-amino-5-cyano-7-nitroindazole, in the form of a deep-red finely crystalline powder melting at 325° C. (with decomposition), is obtained in a yield of 38 g. or 93% of the theoretical.

*Analysis.*—Calcd. for $C_8H_5N_5O_2$ (203.2) (percent): C, 47.3; H, 2.4; O, 15.7; N, 34.5. Found (percent): C, 47.5; H, 2.4; O, 15.9; N, 34.0.

EXAMPLE 3

11.4 g. (0.15 mol) of N-hydroxyethyl hydrazine are added dropwise with stirring to a solution heated to 40° C. of 22.3 g. (0.1 mol) of 2,4-dinitro-6-cyanoanisole in 300 cc. of methanol and 12 cc. of glacial acetic acid. The reaction mixture is stirred for another 2 hours at 60° C. and the product precipitated is filtered off under suction after cooling. After washing the filtration residue with water and methanol, 1-hydroxyethyl-3-amino-5,7-dinitroindazole, in the form of red crystals melting at 278° C. (with decomposition), is obtained in a yield of 25 g. (93% of the theoretical).

*Analysis.*—Calcd. for $C_9H_9N_5O_5$ (267.2) (percent): C, 40.5; H, 3.4; O, 29.9; N, 26.2. Found (percent): C, 40.7; H, 3.5; O, 29.4; N, 26.5.

EXAMPLE 4

12.2 g. (0.05 mol) of trimethoxy-trimesic acid trinitrile are dissolved with heating in 300 cc. of methanol and 12 g. (0.2 mol) of acetic acid. 7.5 g. (0.15 mol) of hydrazine hydrate are added dropwise to this solution at 60° C. and the reaction mixture is stirred for another 3 hours at 60° C. After the reaction mixture has cooled, the pale yellow product precipitated is filtered off under suction. 3-amino-4,6-dimethoxy-5,7-dicyanoindazole, in the form of pale yellow crystals melting at 325° C. (with decomposition) is obtained in a yield of 10 g. of 83% of the theoretical.

*Analysis.*—Calcd. for $C_{11}H_9N_5O_2$ (243.2) (percent): C, 54.3; H, 3.7; N, 28.8; O, 13.2. Found (percent): C, 54.3; H, 4.1; N, 28.1; O, 13.4.

What is claimed is:
1. Substituted 3-aminoindazole of the formula:

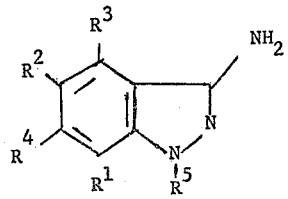

wherein $R^1$ and $R^2$ are individually selected from the group consisting of nitro and cyano; $R^3$ and $R^4$ are individually selected from the group consisting of hydrogen and alkoxy of from 1 to 4 carbon atoms, and $R^5$ is selected from the group consisting of hydrogen, lower alkyl, hydroxy ethyl, phenyl, benzyl, pyridyl, lower alkanoyl, $-CH_2CH_2CN$, $-C(NH)NH_2$, $-CONH_2$ and $-CSNH_2$.

2. A compound as claimed in claim 1 wherein the 3-aminoindazole is 3-amino-5,7-dinitroindazole.

3. A compound as claimed in claim 1 wherein the 3-aminoindazole is 3-amino-5-cyano-7-nitroindazole.

4. A compound as claimed in claim 1 wherein the 3-aminodinazole is 1-hydroxyethyl-3-amino-5,7-dinitroindazole.

5. A compound as claimed in claim 1 wherein the 3-aminoindazole is 3-amino-4,6-dimethoxy-5,7-dicyanoindazole.

References Cited

UNITED STATES PATENTS

| 3,133,081 | 5/1964  | Lafferty et al. | 260—310 C |
| 2,136,133 | 11/1938 | Hauser et al.   | 260—312   |

FOREIGN PATENTS

| 1,369,628 | 7/1964  | France  | 260—465 E |
| 1,254,632 | 11/1967 | Germany | 260—310 C |
| 1,277,857 | 9/1968  | Germany | 260—310 C |

OTHER REFERENCES

Parnell J. Chem. Soc. (London) 1959, pp. 2363–5.
Beck et al.: I Liebigs Ann. Chem. vol. 716, pp. 47–60 (October 1968).
Beck et al.: II Chem. Abst. vol. 70, No. 11553d (1970).
Bianchetti et al.: Gazz. Chim. Acta Ital. vol. 94, pp. 345–354 relied on (1964).

NATALIE TROUSOF, Primary Examiner

U.S. Cl. X.R.

8—4; 260—37 P, 41 B, 41 C, 294.8 C, 294.9, 296 C, 465 R, 465F, 465 H